(12) United States Patent
Liebmann

(10) Patent No.: US 7,661,876 B2
(45) Date of Patent: Feb. 16, 2010

(54) INFRARED TARGET TEMPERATURE CORRECTION SYSTEM AND METHOD

(75) Inventor: Frank E. Liebmann, American Fork, UT (US)

(73) Assignee: Fluke Corporation, Everett, WA (US)

( * ) Notice: Subject to any disclaimer, the term of this patent is extended or adjusted under 35 U.S.C. 154(b) by 62 days.

(21) Appl. No.: 11/940,277

(22) Filed: Nov. 14, 2007

(65) Prior Publication Data

US 2009/0122826 A1    May 14, 2009

(51) Int. Cl.
  *G01K 15/00*   (2006.01)
  *G01J 5/00*    (2006.01)
  *G01N 25/00*   (2006.01)

(52) U.S. Cl. .............................. 374/2; 374/1; 374/121; 374/129; 374/126; 374/9; 374/128

(58) Field of Classification Search ............. 374/1, 374/2, 121, 129, 126, 9, 128
See application file for complete search history.

(56) References Cited

U.S. PATENT DOCUMENTS 6,398,406 B1 *  6/2002  Breiland et al. ............. 374/128
6,585,410 B1     7/2003  Ryan ........................... 374/130

FOREIGN PATENT DOCUMENTS

CA       2108718       4/1994

OTHER PUBLICATIONS

Matis, Greg et al., "*Radiance Calibration of Target Projectors for Infrared Testing*", Proceedings of SPIE: Infrared Imaging Systems, Conference No. 18, vol. 6207, Apr. 2006, pp. 62070N.1-62070N.11.

* cited by examiner

*Primary Examiner*—Gail Verbitsky
*Assistant Examiner*—Mirellys Jagan
(74) *Attorney, Agent, or Firm*—Dorsey & Whitney LLP

(57) ABSTRACT

Infrared Ir Thermometer Calibration Systems and Methods are Disclosed in which the temperature of an IR thermometer calibration system is controlled such that radiation emitted by a target at a given input temperature is equal to the radiation emitted by a graybody heated to the input temperature and having an emissivity equal to an emissivity setting of an IR thermometer to be calibrated using the IR thermometer calibration system.

8 Claims, 4 Drawing Sheets

INFRARED TARGET TEMPERATURE CORRECTION SYSTEM AND METHOD

TECHNICAL FIELD

This invention relates to systems and methods for calibrating infrared thermometer calibration systems used in the calibration of infrared thermometers.

BACKGROUND OF THE INVENTION

Infrared (IR) thermometers measure the IR radiation from bodies and output a temperature corresponding to the intensity of radiation measured within the frequency range of the IR thermometer. IR thermometers are calibrated by sensing the radiation from a thermal target heated to a precisely known temperature. The radiance measured by the IR thermometer may then be mapped to the set temperature of the target.

The accuracy of thermal targets is limited by changes in the emissivity of the target with temperature. The emissivity of the target also varies with the wavelength of radiation incident on and reflected from the target. However, the IR thermometer being calibrated may have an emissivity setting that is less than one, such that the IR thermometer may be used to measure the temperatures of bodies having low emissivities. However, the emissivity setting is typically constant and is therefore not equal to the emissivity of the target across a range of temperatures. Accordingly, the IR thermometer may not be accurately calibrated for all temperatures within a needed range.

In view of the foregoing, it would be an advancement in the art to provide a convenient system and method for accurately calibrating an IR thermometer having a constant emissivity setting using a thermal target having temperature-dependent emissivity.

SUMMARY OF THE INVENTION

In one aspect of the invention, the temperature of an IR thermometer calibration system is controlled such that radiation emitted by a target at a given input temperature is equal to the radiation emitted by a graybody heated to the input temperature and having an emissivity equal to an emissivity setting of IR thermometers to be calibrated using the IR thermometer calibration system.

In another aspect of the invention, a plurality of radiance measurements are taken of the IR thermometer calibration system at a plurality of temperature set points using a reference IR thermometer. The reference IR thermometer may be calibrated using a quasi blackbody and may have an emissivity setting equal to that of IR thermometers to be calibrated using the IR thermometer calibration system. The radiance measurements are used to calculate correction factors mapping the temperature set points to apparent temperatures, the apparent temperatures corresponding to the temperature at which a graybody having an emissivity equal to the emissivity setting would emit the same amount of radiation as detected by the radiance measurement. When an IR thermometer is calibrated using the IR thermometer calibration system, the user inputs a temperature which is then mapped to a temperature set point using the correction factors. The target is then heated to the temperature set point and the radiance measured by the IR thermometer. The IR thermometer is then calibrated to map the measured radiation to the temperature input by the user.

DETAILED DESCRIPTION OF PREFERRED EMBODIMENTS

Figure 1:
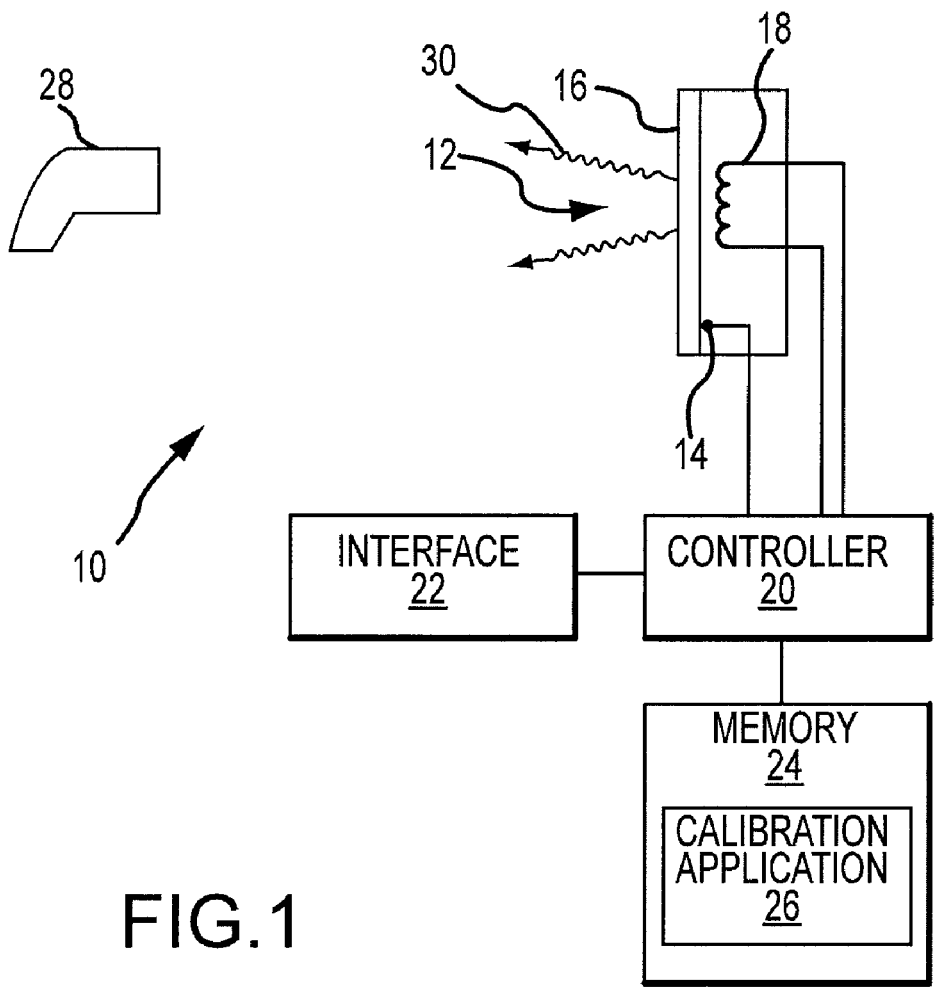
FIG. 1 is a block diagram of an IR thermometer calibration system in accordance with an embodiment of the present invention.

Referring to FIG. 1, an IR thermometer calibration system 10 for infrared (IR) thermometers may include a target 12 in thermal contact with a temperature sensor 14. The target 12 may have a radiating face 16. The face 16 may bear a high-emissivity coating such as a high-emissivity paint, which may have a temperature dependent emissivity, though the emissivity of the coating may vary less with temperature than most substances. The sensor 14 may be positioned opposite the radiating face 16. Accordingly, the reading of the sensor 14 may not indicate the exact temperature of the face 16 due to heat loss to radiation and conduction.

A heating element 18 is also positioned in thermal contact with the target 12. The heating element 18 may be positioned opposite the radiating face 16. The heating element 18 and sensor 14 are coupled to a controller 20 that reads an output from the sensor 14 and controls power to the heating element according to the reading and a set temperature specified by a user or program executed by the controller 20. An interface 22 may be coupled to the controller 20 to enable a user to input a set temperature to the controller 20. A memory 24 coupled to the controller 20 may store test results and other operational and executable data, such as a calibration application 26.

Figure 2:
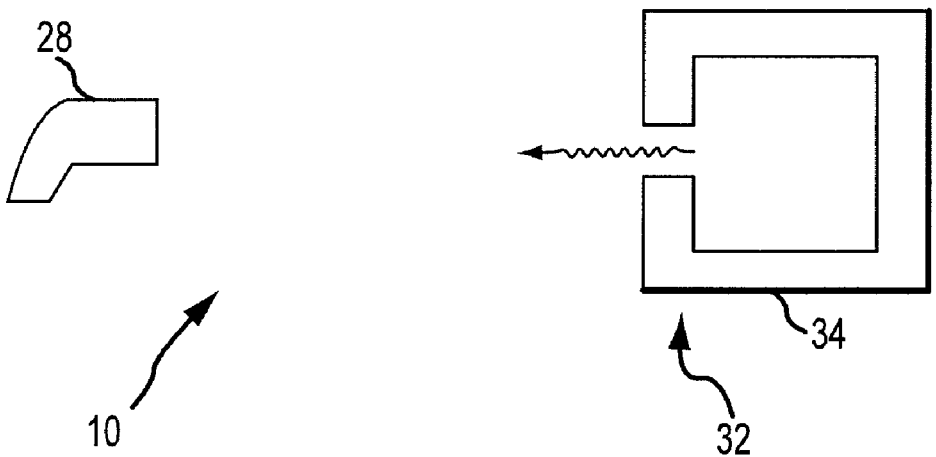
FIG. 2 is a block diagram of an IR thermometer being calibrated using a quasi blackbody in accordance with an embodiment of the present invention.

An IR thermometer 28 may be positioned a distance from the target 12 to receive IR radiation 30 therefrom. The IR thermometer 28 may be coupled to the controller 20 to provide a radiance measurement to the controller 20. Referring to FIG. 2, while still referring to FIG. 1, in one embodiment, the IR thermometer calibration system 10 is calibrated using an IR thermometer 28 that is itself calibrated by a quasi blackbody 32, such as the radiation emitted from a heated chamber 34. The IR thermometer 28 preferably has an accuracy greater than that of IR thermometers to be calibrated using the IR thermometer calibration system 10. The IR thermometer 28 may measure the radiation from the blackbody 32 at various temperature set points and map its output to actual radiance values from the blackbody 32 in the spectral band of the IR thermometer 28, such as 8-14 microns. When measuring radiance values from the blackbody 32, the IR thermometer preferably has its emissivity setting set to about one.

Figure 3:
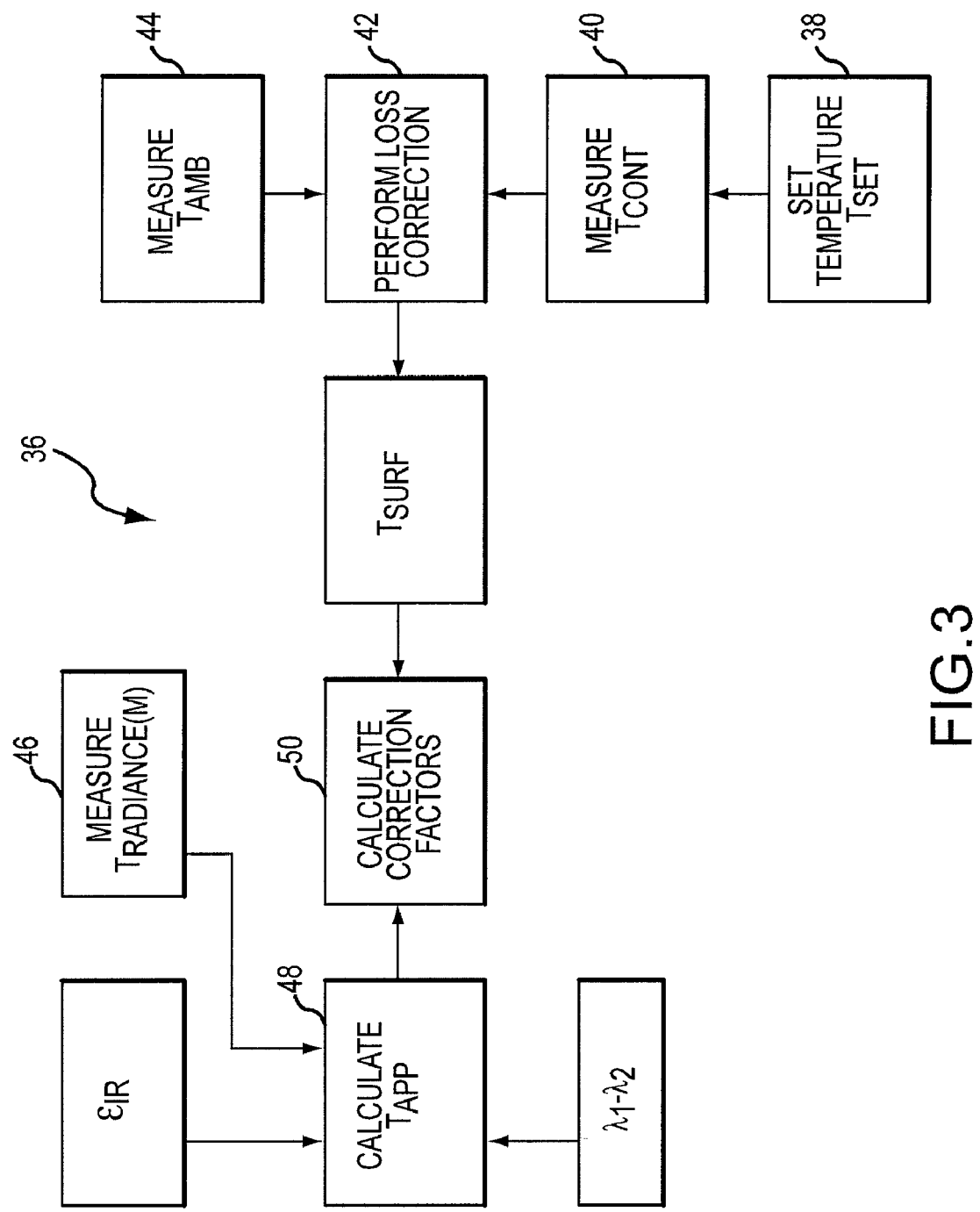
FIG. 3 is a process flow diagram of a method for calibrating an IR thermometer calibration system in accordance with an embodiment of the present invention.

Referring again to FIG. 1, in one embodiment, a user, or the calibration application 26, inputs a series of set temperatures to the controller 20 and the IR thermometer 28 measures the radiance of the target 12 at each temperature set point. Referring to FIG. 3, while still referring to FIG. 1, a method 36, for calibrating an IR thermometer calibration system 10 may include setting a temperature $T_{SET}$ and driving the temperature of the target 12 to proximate $T_{SET}$ at block 38. At block 40, a contact temperature $T_{CONT}$ is measured by reading the output of the temperature sensor 14. At block 42, loss correction is performed to determine a surface temperature $T_{SURF}$ at the face 16 of the target 12. In some embodiments, an ambient temperature $T_{AMB}$ is measured at block 44 and used at block 42 to determine $T_{SURF}$. Determining $T_{SURF}$ may include consulting a look-up table mapping $T_{SURF}$ to a $T_{CONT}$ and, in some embodiments, a $T_{AMB}$ as determined by a prior calibration. Alternatively, $T_{CONT}$ and optionally $T_{AMB}$ may be input to an equation or computational algorithm to determine $T_{SURF}$.

At block 46 the radiance M of the target 12 for the surface temperature $T_{SURF}$ is measured using the IR thermometer 28. The IR thermometer 28 may advantageously be calibrated as described above in relation to FIG. 2. At block 48, the apparent temperature $T_{APP}$ of the target 12 is calculated. $T_{APP}$ may be calculated according to Equation 1, using the expected bandwidth $\lambda 1$-$\lambda 2$, emissivity setting $\epsilon_{IR}$, and/or background temperature setting $T_{BG}$ of an IR thermometer to be calibrated using the IR thermometer calibration system 10. In some embodiments, the IR thermometer 28 used to measure the radiance M may have the same bandwidth $\lambda 1$-$\lambda 2$, $T_{BG}$, and $\epsilon_{IR}$ settings as the units to be calibrated. In such embodiments, the IR thermometer 28 may output a temperature reading that is used as $T_{APP}$.

At block 50, a correction factor is calculated relating $T_{SURF}$ to $T_{APP}$. The method 36 may be repeated for multiple $T_{SET}$ temperatures and their corresponding $T_{SURF}$ temperatures to calculate a $T_{APP}$ and a corresponding correction factor for a number of temperature set points.

The apparent temperature may be calculated by using Equation 1, where M is a particular radiance measurement, $\epsilon_{IR}$ is the expected emissivity setting of an IR thermometer being calibrated, $T_{BG}$ is the expected background temperature setting in degrees Kelvin of the IR thermometer being calibrated, and $T_{APP}$ is the apparent temperature for the particular radiance measurement M. Equation 1 may be solved to determine $T_{APP}$ by any suitable numerical method known in the art.

$$M = \int_{\lambda 1}^{\lambda 2} \frac{\varepsilon_{IR} c_1}{\lambda^5 \left(e^{\frac{c_2}{\lambda T_{APP}}} - 1\right)} d\lambda + \int_{\lambda 1}^{\lambda 2} \frac{(1-\varepsilon_{IR}) c_1}{\lambda^5 \left(e^{\frac{c_2}{\lambda T_{BG}}} - 1\right)} d\lambda \quad \text{Equation 1}$$

In an alternative embodiment of the method 36, the IR thermometer 28 has an emissivity setting of one and is used to take radiance measurements of the IR thermometer calibration system 10 at a number of set temperatures. The readings of the IR thermometer 28 are used to calculate the emissivity of the target 12 at each temperature set point. Calculating the emissivity of the target 12 may include using Equation 1 to solve for $\epsilon_{IR}$, where $T_{SURF}$ for a given set point is substituted for $T_{APP}$ and M is the radiance measured using the IR thermometer 28 at the particular set point, and $\epsilon_{IR}$ is the emissivity of the target 12 at the set point.

When calibrating a unit under test according to the alternative method, these experimentally determined emissivity values may be used to solve Equation 2. The temperature input by an operator is $T_{APP}$ and the actual temperature needed to provide the radiation of a perfect graybody at $T_{APP}$ is calculated using the experimentally determined emissivity values of the target 12 by using Equation 2. In Equation 2, $\epsilon_{TGT}$ is the emissivity of the target at or near a temperature set point, determined as described above. In some embodiments, the value of $\epsilon_{TGT}$ is determined by interpolating between emissivity values determined experimentally as described above or by using a curve fit equation based on the experimentally determined emissivity values. $\epsilon_{IR}$ is the emissivity setting of the unit under test (typically approximately equal to 0.95), $T_{BG}$ is the background temperature, and $T_{APP}$ is the apparent temperature corresponding to a particular set temperature $T_{TGT}$. Equation 2 may be solved to determine $T_{APP}$ by any suitable numerical method known in the art.

$$\int_{\lambda 1}^{\lambda 2} \frac{\varepsilon_{TGT} c_1}{\lambda^5 \left(e^{\frac{c_2}{\lambda T_{TGT}}} - 1\right)} d\lambda + \int_{\lambda 1}^{\lambda 2} \frac{(1-\varepsilon_{TGT}) c_1}{\lambda^5 \left(e^{\frac{c_2}{\lambda T_{BG}}} - 1\right)} d\lambda = \quad \text{Equation 2}$$
$$\int_{\lambda 1}^{\lambda 2} \frac{\varepsilon_{IR} c_1}{\lambda^5 \left(e^{\frac{c_2}{\lambda T_{APP}}} - 1\right)} d\lambda + \int_{\lambda 1}^{\lambda 2} \frac{(1-\varepsilon_{IR}) c_1}{\lambda^5 \left(e^{\frac{c_2}{\lambda T_{BG}}} - 1\right)} d\lambda$$

Figure 4:
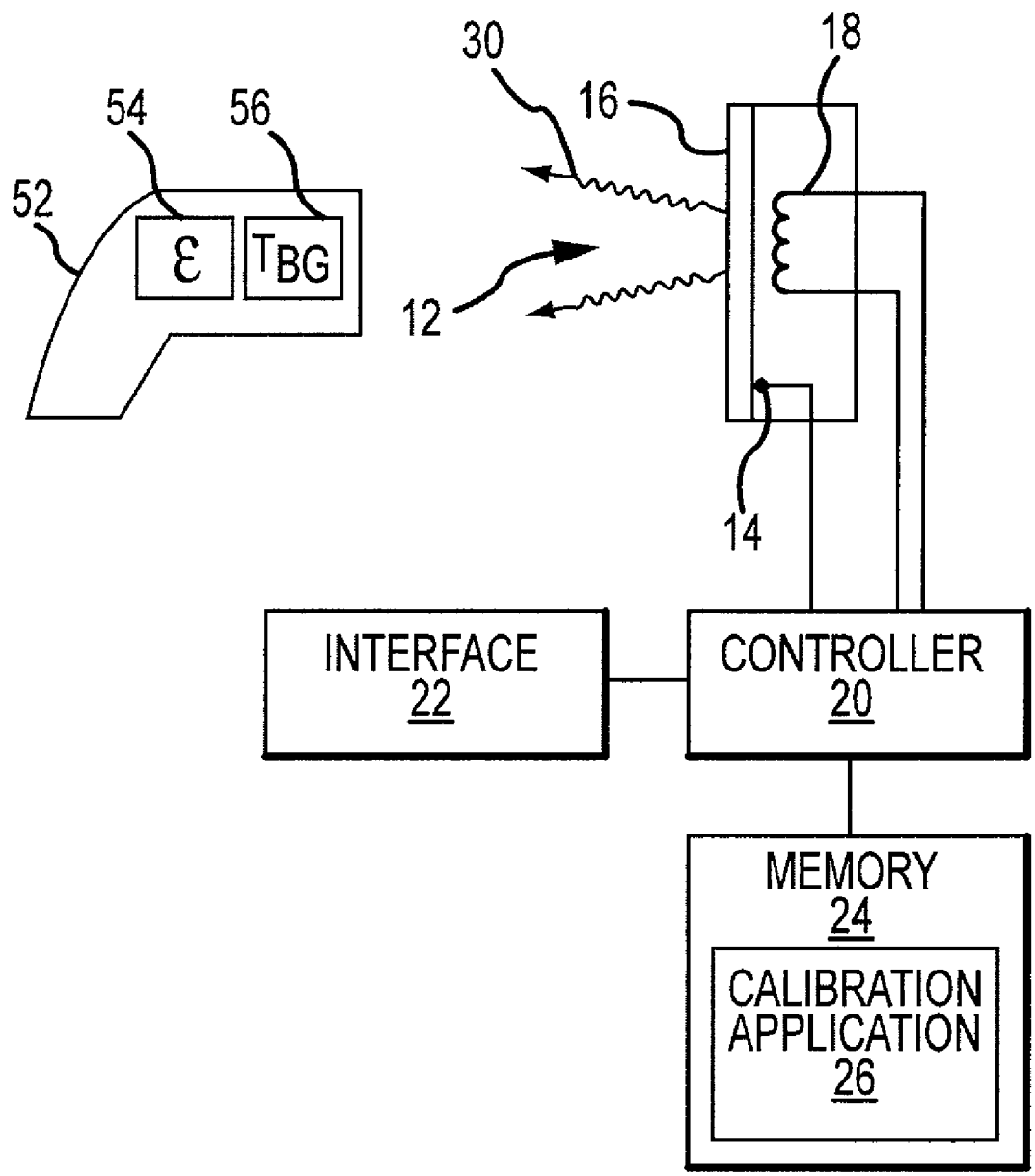
FIG. 4 is a block diagram of a setup for calibrating an IR thermometer using an IR thermometer calibration system in accordance with an embodiment of the present invention.

Referring to FIG. 4, a unit under test (UUT) IR thermometer 52 having an emissivity setting 54 and a background temperature setting 56 may be calibrated using the IR thermometer calibration system 10 as calibrated according to the method of FIG. 3.

Figure 5:
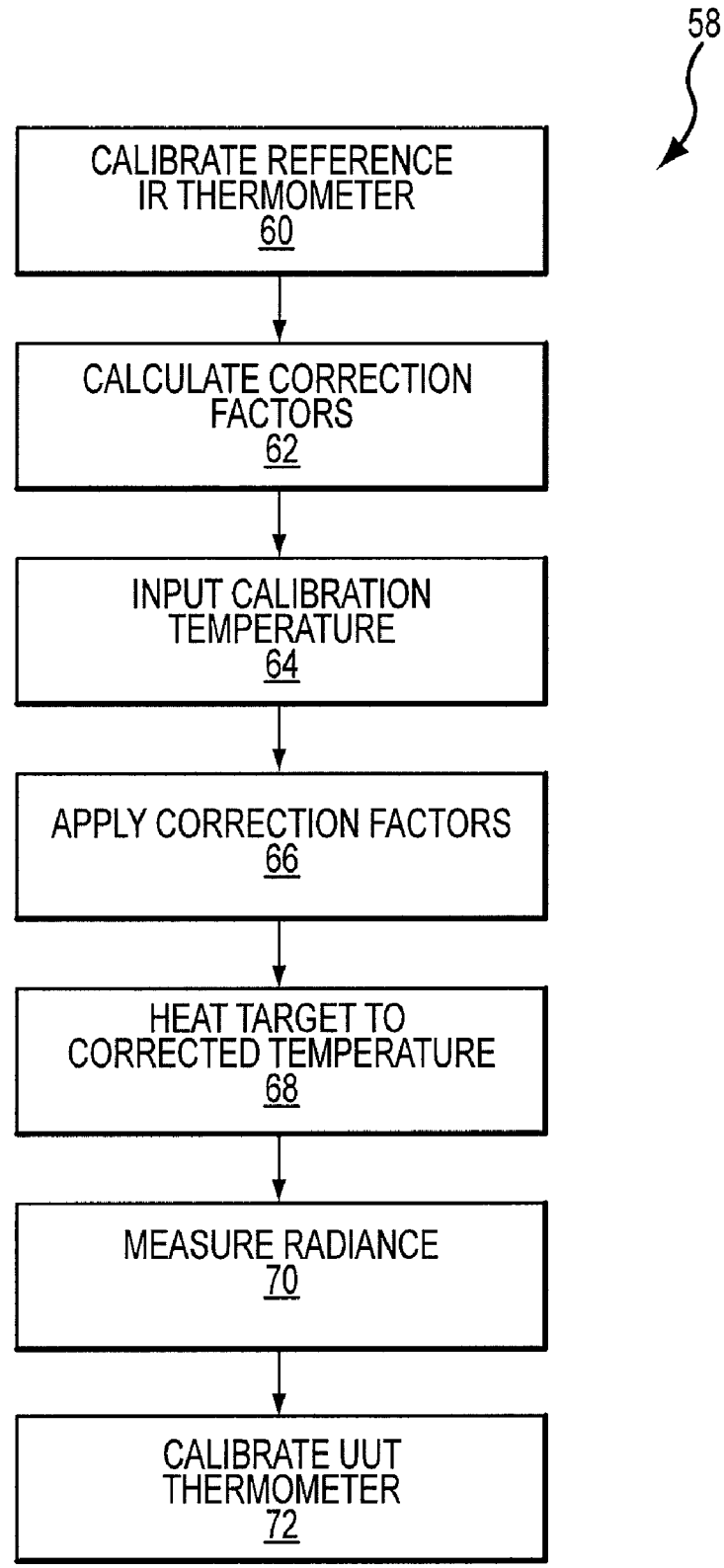
FIG. 5 is a process flow diagram of a method for calibrating an IR thermometer in accordance with an embodiment of the present invention.

Referring to FIG. 5, a method 58 for calibrating the UUT IR thermometer 52 may include calibrating a reference IR thermometer, such as by using the quasi blackbody 32 to calibrate the IR thermometer 28, at step 60. At step 62, correction factors relating temperature set points to apparent temperatures are determined, such as by the method 36. At step 64 a calibration temperature is input to the IR thermometer calibration system 10 as the temperature set point. At step 66, one or more of the correction factors are applied to the calibration temperature by means of direct mapping, interpolation between calculating factors for tested set temperatures bounding the calibration temperature, or by applying a curve fit equation determined according to the correction factors determined according to the method 36. The correction factors relate the calibration temperature to a corrected temperature for the face 16. The corrected temperature is the temperature at which the radiation emitted by the face 16 will be about equal to the radiation emitted by a graybody having an emissivity equal to the emissivity setting of the UUT IR thermometer 52 and heated to the calibration temperature. The IR thermometer calibration system 10 then heats the target face 16 to the corrected temperature at step 68. Step 68 may include calculating a $T_{CONT}$ value for the temperature sensor reading that corresponds to the face 16 being at the calibration temperature and heating the face 16 such that $T_{CONT}$ is equal to a value corresponding to a face temperature $T_{SURF}$ approximately equal to the calibration temperature.

At step 70, the radiance of the target is measured with the UUT IR thermometer 52. At step 72 the UUT IR thermometer is calibrated to output the calibration temperature when subject to the radiance measured at step 70. The UUT IR thermometer 52 may then measure radiance from other bodies and output a temperature corresponding to the radiation of the bodies according to the temperature calibration at step 72.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A method for calibrating an infrared target comprising:

taking a plurality of first radiance measurements of an infrared target, each of the plurality of radiance measurements being taken with the infrared target heated to one of a plurality of target set temperatures;

for each first radiance measurement calculating an apparent temperature of a graybody having a radiance equal to the first radiance measurement and having an emissivity substantially equal to an emissivity setting of an infrared thermometer;

mapping each of the apparent temperatures to one of the plurality of set temperatures corresponding to the same one of the plurality of radiance measurements;

inputting a calibration temperature into a controller coupled to the infrared target;

heating the target to one of the plurality of set temperatures mapped to one of the plurality of apparent temperatures corresponding to the calibration temperature;

taking a radiance measurement of the target with the infrared thermometer; and calibrating the infrared thermometer to map the radiance measurement to the calibration temperature.

2. The method of claim 1, wherein taking the plurality of first radiance measurements of the infrared target comprises taking a plurality of first radiance measurements of the infrared target with the infrared thermometer calibrated according to a simulated blackbody.

3. The method of claim 1, wherein the target has a high-emissivity coating.

4. The method of claim 1, further comprising measuring a radiance of a subject using the infrared thermometer and outputting a temperature corresponding to the step of calibrating the infrared thermometer.

5. The method of claim 1, further comprising deriving a plurality of contact temperatures for each of the plurality of set temperatures, the plurality of contact temperatures each corresponding to an output of a sensor in thermal contact with a target when the surface of the target is at the set temperature, wherein the step of heating the target to one of the plurality of set temperatures comprises heating the target such that the temperature sensor produces an output corresponding to the contact temperature corresponding to one of the plurality of set temperatures.

6. The method of claim 1, wherein the emissivity setting is less than one.

7. The method of claim 6, wherein the emissivity setting is between about 0.9 and one.

8. The method of claim 7, wherein the emissivity is between about 0.9 and about 0.95.

* * * * *